Jan. 24, 1967 T. W. ROYER 3,299,767
RELEASABLE SECURING MEANS
Filed Nov. 6, 1964

INVENTOR.
THURBER W. ROYER
BY Edward O. Ansell
George I. Netter
ATTORNEYS

United States Patent Office 3,299,767
Patented Jan. 24, 1967

3,299,767
RELEASABLE SECURING MEANS
Thurber W. Royer, Arcadia, Calif., assignor to Aerojet-General Corporation, Azusa, Calif., a corporation of Ohio
Filed Nov. 6, 1964, Ser. No. 409,385
2 Claims. (Cl. 85—32)

The present invention relates broadly to releasable securing means, and, more particularly, to such means the securing relation of which is destroyed substantially instantaneously through the instrumentality of an explosive force.

There are many situations where it may be desirable that securing means, such as a nut and bolt, can be rapidly unsecured. Among others, escape hatches on aircraft or aboard ship are excellent examples. One well-known way of accomplishing this heretofore, where the securing means are a nut and bolt, has been to embed an explosive medium within the bolt which upon detonation destroys the bolt and thereby the securing relation of the bolt to the nut. Such "explosive bolts" although accomplishing the fundamental quick-release function are accompanied by certain inherent disadvantages, such as, for example, the bolt frequently shatters into a number of different fragments that can damage other apparatus in the vicinity. Most important, however, since the bolt is frequently a load-carrying member, the provision of openings therein for accommodation of the explosive charge may severely weaken the securing means, or require use of a larger size.

For this reason, it is considered advisable in many situations to provide a specially formed nut that is provided with an explosive charge which on detonation serves to separate the nut from the bolt. In this manner the rapid disengagement of the nut and bolt is accomplished without the severe weakening of the bolt described above. This advantage is a natural result of the geometry of the nut in that the hoop tension of a nut is not more than ten percent of the axial tension of a bolt when provided with sixty degree V-groove threads. This means that a nut having sufficient wall thickness to withstand, say, 20,000 p.s.i. hoop tension could, other things being equal, accommodate a bolt loaded to 200,000 p.s.i. Present day explosive nuts have an elongated body member such that when engaged with a bolt, a portion extends beyond the bolt terminus for accommodating detonating charge threaded into its inner bore. On detonation of the charge, the outwardly expanding gases fracture the nut releasing the securing relation to the bolt.

Exploding members of this construction are also not completely satisfactory for many purposes. For example, there are cases where the nut instead of being at the end of the bolt would, for other reasons, have to be farther down the shank with the bolt extending completely therethrough. In this case, the above-described construction would obviously not be satisfactory. Also, if the nut is received too far onto the bolt, the detonating cartridge may not extend sufficiently enough within the nut to completely destroy it upon detonation.

According to the present invention, a sleeve-like nut is provided with threads along at least one bore for being received in conventional securing relation upon a mating bolt. A detonation charge structure is embedded within the wall portion of the nut itself, such that upon detonation the shock wave essentially travels in a direction circumferentially about the nut. An additional aspect is the provision of expansion grooves along the inside of the threaded nut bore along which expanding gases on detonation are distributed achieving an increased leverage effect of the explosion. Still another feature of the invention is the provision of linking means relating the different separated pieces of the nut after explosive destruction.

For a more complete understanding of the invention, reference is made to the following description and the accompanying drawings, in which.

Figure 1:
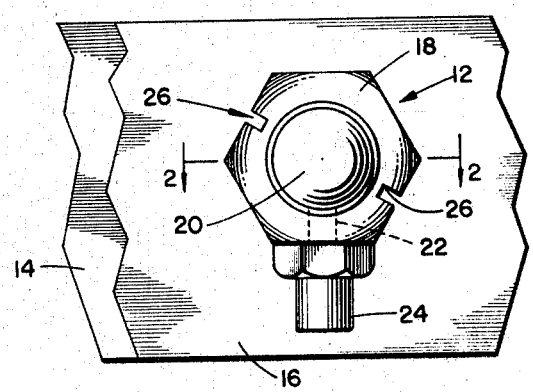
FIG. 1 is a perspective view of the invention as viewed along the bolt shown in securing relation to a pair of members.
Figure 2:
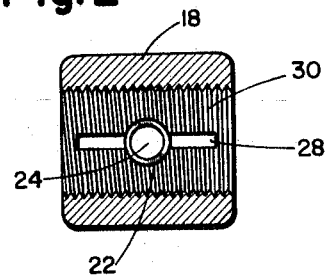
FIG. 2 is a sectional view of the special nut of the invention of FIG. 1.

Turning now particularly to FIGS. 1 and 2, a nut and bolt assembly 12 of the invention are shown in assembled and operative relation maintaining a pair of members 14 and 16 in secured relation. The assembly includes a nut 18 of special construction to be described in detail herein and a conventional bolt 20, both of which are provided with threads for mutual engagement.

In its major aspects, the nut 18 consists of a sleeve-like body having a threaded bore for being received on the bolt 20. The wall portions of the nut further define an opening 22 into which is received a detonating device 24. The detonating device can have as its primary operative agent any of a number of well-known different types of squibs, or pyrotechnic means, which on ignition produces rapidly expanding high velocity gases forming the desired explosion. This explosion provides not only high-pressure gas products but also shock forces that pass through the body of the nut-effecting its destruction. No details of apparatus for igniting the detonating means it shown since they are not of critical importance to the operation of the invention.

More particularly, the detonating device 24 consists of a body member for containing a supply of the explosive agent. Also, a portion of the body member is so dimensioned that it can be received within the opening 22 and provided with threads for establishing a secure engagement of the detonating device to the nut 18.

Figure 5:
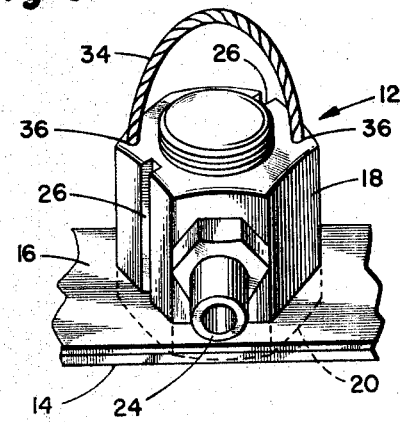
FIG. 5 is a perspective view showing the use of a separated parts linking means.

Turning attention to the detailed construction of the nut 18, FIGS. 1 and 5 show the provision of a pair of pressure intensifying grooves 26 arranged at diametrically opposed points on the outermost surface of the nut and each extending throughout the complete length of the nut. On explosion of the detonating device the forces exerted on the nut are concentrated along these grooves serving to intensify destruction of the nut at the grooves breaking the nut into two pieces. The use of pressure intensifying grooves not only insures breakage of the nut into separate pieces (and therefore complete releasing of the securing relation to the bolt 20), but also limits the number of pieces created. Thus, instead of producing a plurality of pieces of the nut body of various and irregular shapes, explosive destruction of a nut of this structures produces two substantially equal sized pieces.

An additional structural feature is the provision of a pair of pressure distribution grooves or manifolds, shown best in FIG. 2. These grooves are cut into the threads 30 that line the major bore of the nut, and are in open communication with the opening 22. They extend away from the opening 22 along a line substantially parallel to the axis of the nut bore, forming an enclosed chamber. The rapidly expanding gases on detonation are initially directed along these grooves acting to spread the explosive force within the bore of the nut thereby assisting in its destruction.

Figure 3:
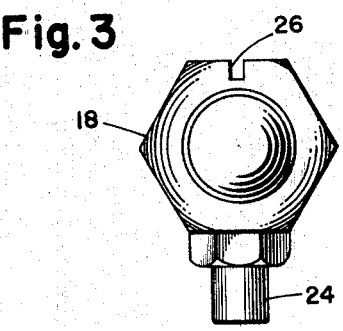
FIG. 3 is a modification of the structure of FIG. 1 where a single-piece destruction is achieved.

FIG. 3 illustrates another embodiment in which a single pressure intensifying groove 26 is furnished at a point diametrically opposite the detonator 24. In use, this arrangement will tend to produce a single fragment of a generally C-shape, which is advantageous where the production of fragments may interfere with nearby equipment, for example. In view of the concentration of the explosion effect here on a single stress raising groove the line of fracture is somewhat cleaner than in the case of the two-grooved structure of FIG. 1.

Figure 4:
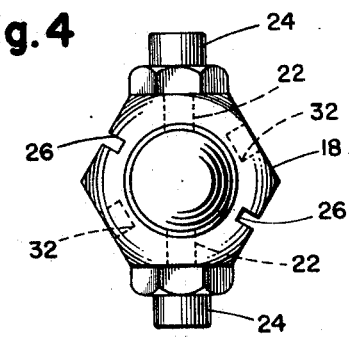
FIG. 4 is a further embodiment showing accommodation of multiple explosive charges.

A further aspect is the construction of FIG. 4. It is basic here that it may be advisable to have more than one detonator in operative association with a nut to be destroyed. As shown, two openings 22 have been provided in the nut with individual detonators received therein, and two unused openings 32. This arrangement may be especially advantageous where mounting is made in areas of limited access. For example, if only one opening is provided, when secured to a bolt it may be in such a position as to make insertion of a detonator impossible, whereas with the four openings illustrated detonator mounting can be easily accomplished from any disposition of the nut on the bolt. It is also contemplated that the unused openings 32 be plugged with a suitable filler material (epoxy cement, lead and the like) where exposure to adverse environments is to be experienced.

Figure 6:
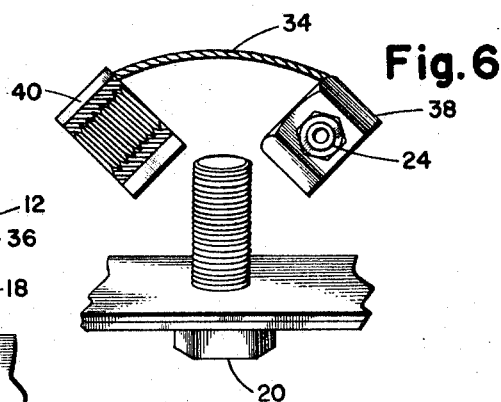
FIG. 6 illustrates a nut after destruction with the special linking means of FIG. 5 in operative relation.

FIGS. 5 and 6 represent yet another advantageous modification, one which serves to restrain the motion of the different pieces of the nut after explosive destruction. Constructively, a cord or cable 34 has each of its ends secured within suitable dimensioned openings found in the respective two halves of the nut. More particularly, the two ends of the cable are fixed to the body of the nut on opposite sides of the plane defined by the pair of pressure intensifying grooves 26. When explosive rupture occurs along these grooves the two resulting parts are held together by the cable (FIG. 6) thereby preventing what might be the high velocity distribution of the different parts into the vicinity.

In the description given above, the detonator has been set forth as secured within an accommodating opening in the nut, through the intermediary of screw threads. This, however, is not meant to preclude accomplishing the securing relationship by mechanical means, such as a spring loaded fastener, or a key and keyway arrangement, to mention but a few possibilities. Thus, although a screw thread arrangement is for most purposes the simplest and easiest accomplished, there may be special situations where other means may be desirable.

While a particular embodiment of the invention has been illustrated and described, it will be understood that the invention should not be construed as being limited thereto, but only to the scope of the claims.

What is claimed is:

1. A nut cooperatively acting with a bolt to secure at least two elements together and for substantially simultaneously effecting separation of the elements, comprising:
   a sleeve member having its internal bore provided with threads for being received upon the bolt in securing relation,
   the bore threads being modified to provide at least one longitudinally extending groove in communication with the opening through the sleeve wall and serving to define a closed expansion manifold into which the gaseous explosion products move on detonation of the charge;
   the wall portions of the sleeve defining an opening directed generally transversely of the main bore and provided with threads;
   a member including a hollow chamber and having a threaded portion for being securingly received within the opening in the wall portion of the sleeve member;
   an explosive charge for being contained within the chamber of the member and detonatable from without;
   whereby detonation of the charge effects fragmentation of the sleeve member walls forming the nut effecting release of the nut and bolt and consequently the joined elements.

2. A nut as in claim 1, wherein the outer surface of the sleeve member is adapted to define at least a pair of grooves extending longitudinally of the bore axis serving as fracture lines, and cordlike interconnecting means relating different separable parts of the sleeve member that will be formed upon detonation such that after detonation the separated parts are released from the associated bolt but linked together by the interconnecting means.

References Cited by the Examiner

UNITED STATES PATENTS

| | | | |
|---|---|---|---|
| 2,679,783 | 6/1954 | Smith | 89—1.5 X |
| 2,858,726 | 11/1958 | Robinson et al. | 85—32 |
| 2,871,750 | 2/1959 | Parrish | 85—32 |
| 2,883,910 | 4/1959 | Nessler | 89—1 |

BENJAMIN A. BORCHELT, *Primary Examiner.*

SAMUEL W. ENGLE, SAMUEL FEINBERG,
*Examiners.*